May 14, 1929.  C. J. W. CLASEN  1,712,743
RAILWAY CAR TRUCK
Filed Nov. 18, 1927   2 Sheets-Sheet 1

INVENTOR
C. J. W. Clasen
BY
Evans & McCoy
ATTORNEYS

May 14, 1929.  C. J. W. CLASEN  1,712,743
RAILWAY CAR TRUCK
Filed Nov. 18, 1927  2 Sheets-Sheet 2

INVENTOR
C. J. W. Clasen
BY
Evans & McCoy
ATTORNEYS

Patented May 14, 1929.

1,712,743

UNITED STATES PATENT OFFICE.

CLAUS J. WERNER CLASEN, OF DAVENPORT, IOWA, ASSIGNOR TO THE BETTENDORF COMPANY, OF BETTENDORF, IOWA, A CORPORATION OF IOWA.

RAILWAY-CAR TRUCK.

Application filed November 18, 1927. Serial No. 234,136.

This invention relates to railway car trucks and while it is to be understood that the invention is of quite general application, the truck herein disclosed is particularly applicable to railway freight cars.

The present invention has for its object to provide a truck of simple and rugged construction in which the supporting wheels are mounted for independent rotation and which meets all the requirements of modern railway service and may be manufactured economically.

A further object of the invention is to provide a truck of the character above referred to in which standard brake beams are employed, but in which the brake beams are mounted at the ends of the frame in advance of the front wheels and to the rear of the rear wheels so that the brakes are more readily accessible for replacement or repair and so that a shorter wheel base may be used if desired.

A further object is to provide a truck of the independent wheel type in which the truck is so constructed as to possess ample strength without increase in weight or cost of manufacture over standard types of car trucks heretofore used.

A further object is to provide a truck in which the wheels are carried by separate axles so as to reduce to a minimum the rail friction, the bearing friction and the wear on wheel flanges and treads.

Further objects are to provide a truck in which the wheels are readily removable, in which brake mechanism may be quickly and easily applied to or removed from the truck, in which the bolster is effectively supported and in which the truck frame is composed of a few parts which may be quickly and easily assembled.

With the above and other objects in view, the invention may be said to comprise a structure as illustrated in the accompanying drawings hereafter described and particularly set forth in the appended claims, together with such variations and modifications thereof as will be apparent to one skilled in the art to which the invention appertains.

Reference should be had to the accompanying drawings forming a part of this specification in which.

Figure 1:
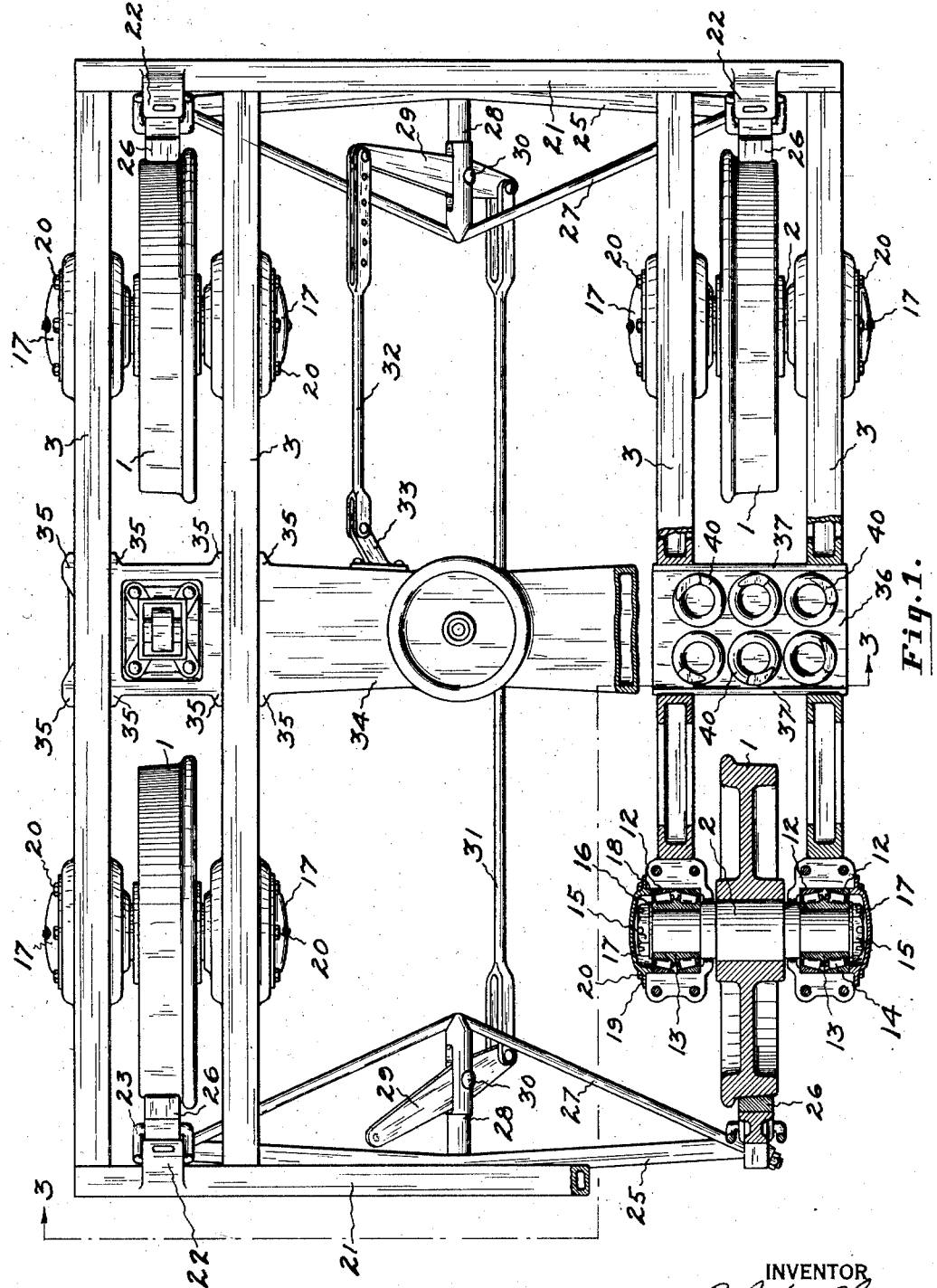
Figure 1 is a top plan view of a truck embodying the invention, with a portion of the frame broken away to show the mounting of a wheel and the mounting of the bolster supporting springs.
Figure 2:
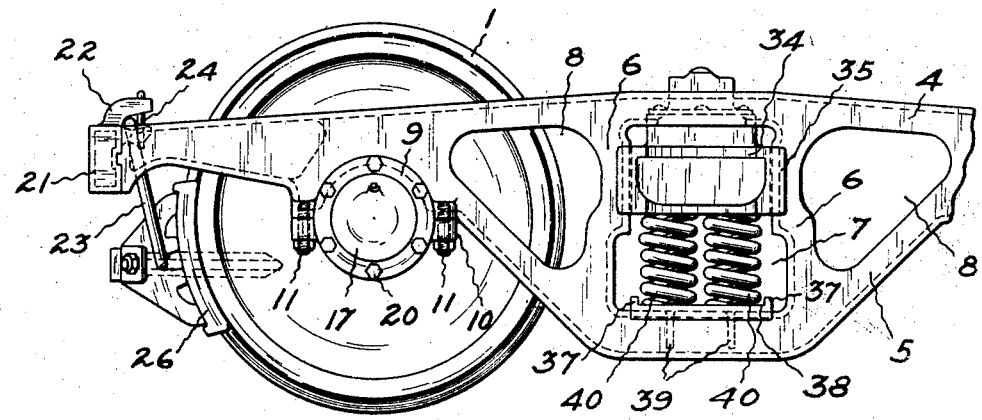
Fig. 2 is a fragmentary side elevation forming a central portion and one end portion of the truck.
Figure 3:
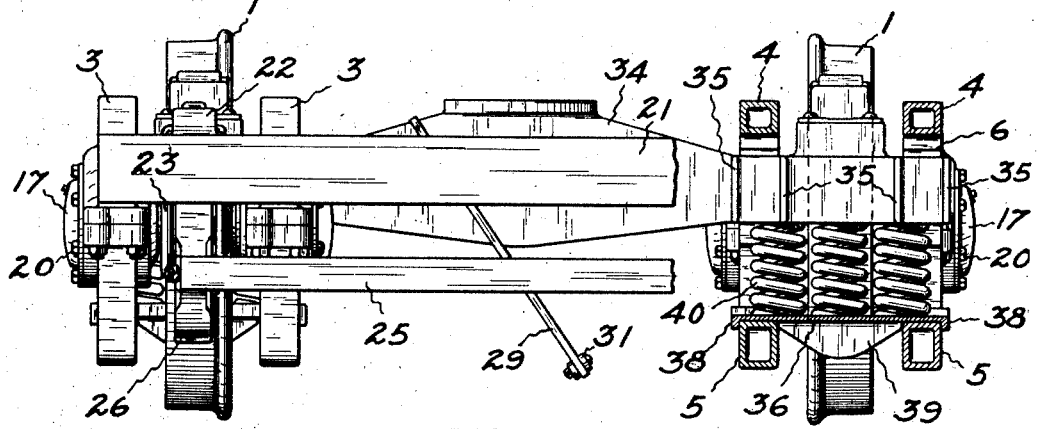
Fig. 3 is an end elevation of the truck broken away upon the side as indicated by section 3—3 of Fig. 1, to show the longitudinal frame members and spring seat in section.

Referring to the accompanying drawings, it will be observed that the truck has each of its supporting wheels 1 mounted for independent rotation and in the construction shown in the drawings, each wheel is provided with a short axle 2, which projects upon opposite sides of the wheel and is journaled in longitudinal frame members 3, which are arranged in pairs adjacent opposite sides of the truck. While the frame members are shown as U shape in section, it is obvious that the frame members may be L shaped or T shaped if desired.

The four longitudinal frame members 3 are identical in form and are preferably castings. Each of the frame members 3 has an arched top chord 4 and a bottom chord 5 which is of truss form and connected with the top chord at points spaced from the ends thereof. The top and bottom chords 4 and 5 are connected intermediate the ends of the bottom chord 5 by integral columns 6 which are spaced apart to form a central substantially rectangular opening 7 and triangular openings 8 between the outer sides of the columns and the inclined end portions of the chord 5. Beyond the ends of the lower chord 5, each of the frame members is provided on the under side thereof with semi-cylindrical bearing recesses 9 which cooperate with semi-cylindrical bearing members 10, which are secured to the frame members by bolts 11. Outer bearing rings 12 are mounted within each of the cylindrical frame openings, a pair of the rings 12 being mounted in each of the openings, the rings 12 having conical outwardly tapering interior surfaces forming roller raceways. Each of the axles 2 is provided with a bearing collar 13 at each end and each of these collars has two external raceway grooves, the bottoms of which are conical and oppositely inclined. The collars 13 and rings 12 provide the inner and outer races of a roller bearing in which two rows of conical rollers 14 are mounted between the collar and rings, the oppositely inclined raceways and conical rollers forming thrust bearings for rigidly holding the axle and wheel against lateral movement. The inner bearing collars 13 are held in place by nuts 15 and washers 16 and the outer bearing rings 12 are held in place by a retaining cap 17, which has a cylindrical flange which fits in the frame opening and bears against the outer of the rings and a flange 19 which overlies the face of the frame member and is secured thereto by bolts 20.

The frame members 3 are rigidly connected at their opposite ends by end frame bars 21, which are rigidly secured to each of the longitudinal frame members which project beyond the front and rear wheels. Each of the end bars 21 is provided adjacent its opposite ends with integral hooks 22 from which are suspended links 23, which are retained on the hooks by means of pins 24. At each end of the truck, a brake beam 25 is supported by the links 23 and each of these brake beams has brake shoes 26 at the ends thereof, which are adapted to engage the treads of the adjacent wheels. Each brake beam has a truss rod 27 connected to the ends thereof and extending over the outer end of a strut 28 which extends inwardly from the beam at the center thereof. Each strut 28 is slotted and has mounted therein a brake actuating lever 29, which is connected intermediate its ends to the strut by a pivot 30. The lower ends of the levers 29 at the opposite ends of the truck are connected by a link 31 and the upper end of one of the levers is connected by a link 32 to a bolster bracket 33. The lever 29 at the end of the truck opposite the lever 29 connected to the bolster may be connected through suitable operating connections to the brake lever system on the car. When the upper end of this lever is rocked forwardly, both brake beams are swung toward the wheels and the brake shoes are brought into contact with the wheels with a pressure proportional to the thrust exerted on the operating lever.

The truck is provided with a central bolster 34 which has end portions extending through the central apertures 7 of the frame members 3 and yieldably supported in any suitable manner on the frame members. As will be readily understood, the bolster may be mounted in the frame members in various ways, either directly guided for vertical movement in the frame members or supported by means permitting a limited lateral movement. As herein shown the bolster 34 is provided at each end with vertically disposed integral guide ribs 35, which overlie the inner and outer sides of the column 6 of each of the four frame members. Mounted in the bottoms of the aperture 7 of each side pair of longitudinal frame members is a spring seat 36 which is preferably of channel form having upwardly projecting side flanges 37 and downturned end flanges 38 which overlie the outer faces of the bottom chords 5. The spring seats are also provided with a pair of integral reinforcing ribs 39, which terminate short of the ends of the seat a distance sufficient to provide a notch in the under side of the seat to receive the bottom chords 5 so that the seats provide a rigid connection between the bottom chords 5 of each pair of longitudinal frame members. The seats 36 provide supports for bolster supporting springs 40 which serve to yieldably support the bolster.

Figures 4, 5:
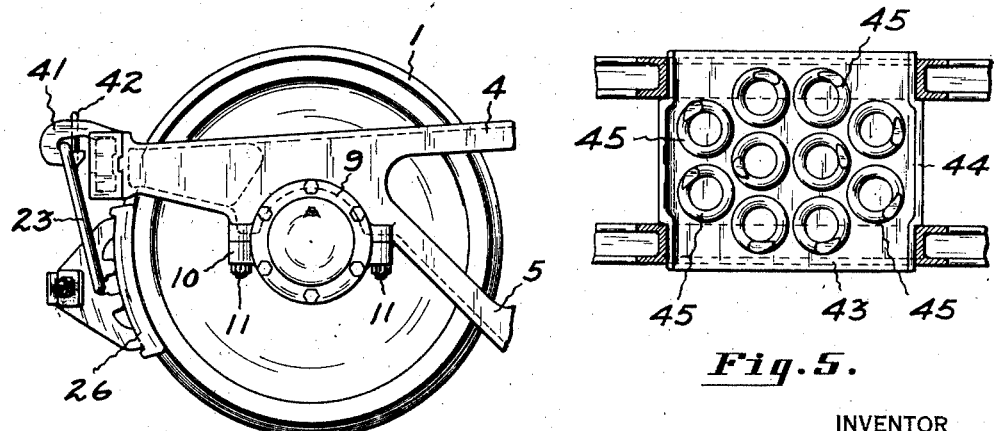
Fig. 4 is a fragmentary detail view showing a modified form of brake beam support.
Fig. 5 is a detail view showing a modified form of spring nest.

In Fig. 4 of the drawing, there is shown a slight modification of the structure in which the brake beam supporting hooks 41 extend outwardly from the end frame bars, these hooks being provided with pins 42 for retaining the beam supporting links in place thereon. The provision of outwardly projecting brake beam supporting hooks provides a brake beam support upon the exterior of the frame which is readily accessible both for mounting the brakes and for removing the same from the frame.

In Fig. 5 of the drawing, there is shown a modified form of spring seat in which a relatively wide spring seat 43 is provided which is lengthened with respect to the side frames and has side portions 44 projecting between the frame members, the wide spring seat being adapted to receive a relatively large number of bolster supporting springs 45 of standard size. This spring support of increased size is made possible by reason of the fact that the brakes which ordinarily occupy a considerable portion of the space between the wheels are mounted upon the ends of the truck frame so that the lengthened spring seats are made possible.

It will be apparent that the individual mounting of the wheels reduces said friction by reason of the independent rotation of the wheels in passing over irregularities in the track and around curves, that the roller thrust bearings not only reduce the bearing friction, but also serve to rigidly hold the wheels against lateral play in the truck frame, thereby materially reducing flange wear and that the removable bearing members permit any one of the wheels and its bearing to be quickly and easily removed and replaced. A further important advantage of the present invention is that it provides for the mounting of standard brake beams with the usual actuating connections to be mounted at the ends of the truck where they are readily accessible and easily removable for replacement or repair. The mounting of the brakes at the ends of the truck also provides a greater free space between the wheels for the bolster supports, permitting a larger number of bolster supporting springs to be used and the truck frame to have a shorter wheel base when desirable.

If it be desired to have the brake beams located between the wheels, this may be accomplished by providing a longer wheel base in order that they may be so placed.

It will also be seen that in this construction wherein the wheels are carried by axles mounted between the pairs of frame members, thrusts are taken by the frame members in both directions. Also as the thrusts are distributed between four frame members, the members of each pair may be considerably lighter than when a single frame member at each side of the truck is employed.

Furthermore, it is to be understood that the particular forms of apparatus shown and described, and the particular procedure set forth are presented for purposes of explanation and illustration and that various modifications of said apparatus and procedure can be made without departing from my invention as defined in the appended claims.

What I claim is:

1. A truck having independently rotatable wheels and comprising four identical longitudinal frame members, a pair of which are arranged side by side on opposite sides of the wheels at each side of the truck, each of the frame members having end portions containing bearings that completely encircle the axles of the wheels, said frame members projecting beyond the wheels and having a central portion of increased depth, each being provided with a bolster receiving aperture having an upper guide portion and a lower portion of greater width through which an end of the bolster may be inserted, end members connecting the ends of said frame members, a bolster having its ends extending through said apertures and guided for vertical movement in the upper portions thereof, spring seats carried by said frame members, and springs interposed between said seats and said bolster.

2. A truck having independently rotatable wheels and comprising four identical longitudinal frame members, a pair of which are arranged side by side on opposite sides of the wheels at each side of the truck, each of the frame members having end portions overlying the axles of the wheels and projecting beyond the wheels and central portions of increased depth, each provided with a bolster receiving aperture having an upper guide portion and a lower portion of greater width through which an end of the bolster may be inserted, end members connecting the ends of said frame members, a bolster having its ends extending through said apertures and guided for vertical movement in the upper portions thereof, spring seats carried by said frame members, springs interposed between said seats and said bolster, and a standard brake beam suspended from each end of said frame, one in advance of the front wheels and the other to the rear of the rear wheels.

3. A truck having independently rotatable wheels and comprising four identical longitudinal frame members, a pair of which are arranged side by side on opposite sides of the wheels at each side of the truck, each of the frame members having end portions containing bearings that completely encircle the axles of the wheels and projecting beyond the wheels and a central portion of increased depth, each provided with a bolster receiving aperture having an upper guide portion and a lower portion of greater width through which an end of the bolster may be inserted, end members connecting the ends of said frame members, a bolster having its ends extending through said apertures and guided for vertical movement in the upper portions thereof, a spring seat extending through the central apertures of each pair of frame members and resting upon the bottoms of the apertures, each seat having projections on its under side engaging the inner and outer faces of the frame members, and springs interposed between said seats and said bolster.

4. A truck having independently rotatable wheels and comprising four identical longitudinal frame members, a pair of which are arranged side by side on opposite sides of the wheels at each side of the truck, each of the frame members having end portions overlying the axles of the wheels and projecting beyond the wheels and a central portion of increased depth, each provided with a bolster receiving aperture having an upper guide portion and a lower portion of greater width for insertion or removal of the bolster, end members connecting the ends of said frame members, a bolster having its ends extending through said apertures and guided for vertical movement in the upper portion thereof, said bolster having integral projections overlying opposite faces of each of said side members at the front and rear of said aperture.

5. A truck having independently rotatable wheels and comprising four identical longitudinal frame members, a pair of which are arranged side by side on opposite sides of the wheels at each side of the truck, each of the frame members having end portions containing bearings which completely encircle the axles of the wheels and projecting beyond the wheels and a central portion of increased depth, each provided with a bolster receiving aperture having an upper guide portion and a lower portion of greater width through which the bolster may be inserted, end members connecting the ends of said frame members, a bolster having its ends extending through said apertures and guided for vertical movement in the upper portions thereof, spring seats rigidly connecting the frame members of each pair adjacent the bottoms of the central portions thereof, and springs interposed between said seats and said bolster.

6. A truck having four identical frame members arranged in pairs on opposite sides, each frame member having projecting end portions, each having a half bearing recess on the under side thereof, each frame member having a central portion of increased depth, each provided with a substantially rectangular aperture having an upper guide portion of less width than the lower portion, supporting wheels mounted between each pair of frame members adjacent the front and rear ends thereof, each wheel having an axle provided with bearing members fitting in the recesses of the end portions of the frame members, bearing retaining members detachably secured to the under sides of said end portions of the frame members, a bolster having its ends supported for vertical movement in the upper guide portions of the apertures of the frame members, and means for yieldably supporting said bolster.

7. A truck having four longitudinal frame members arranged in pairs on opposite sides, end bars connecting the frame members, a bolster yieldably supported at its ends in said frame members, supporting wheels between each pair of frame members positioned between the bolster and end bars, an axle secured to the frame members for each wheel, and mounting means for holding the axles at each end of the truck in axial alinement.

8. A truck having four longitudinal frame members arranged in pairs on opposite sides, end bars connecting the frame members, a bolster yieldably supported at its ends in said frame members, supporting wheels between each pair of frame members positioned between the bolster and end bars, each wheel having an axle and said frame members having roller thrust bearings in which the axles are journaled, and standard brake beams suspended from said truck at the opposite ends thereof.

9. A truck having four longitudinal frame members arranged in pairs on opposite sides, end bars connecting the frame members, a bolster yieldably supported at its ends in said frame members, supporting wheels between each pair of frame members positioned between the bolster and end bars, each wheel having an axle and said frame members having roller thrust bearings in which the axles are journaled, brake beams flexibly suspended from said truck at the opposite ends thereof, levers carried by each beam, a link connecting said levers and a link connecting one of said levers to the bolster.

10. A truck having independently rotatable wheels and four identical longitudinal frame members, a pair of which are arranged upon opposite sides of the wheels at each side of the truck, each of the frame members being in the form of a casting and having an arched upper chord and a lower chord of truss form joining the upper chord at points spaced from the ends of the frame member, spaced columns connecting said chords and forming a substantially rectangular opening, the end portions of said frame members overlying the axles of the wheels and projecting beyond the wheels, end members connecting the ends of the frame members, spring seats interlocking with the bottom chords of each pair of frame members, a bolster having end portions extending through the apertures of said frame members and having guide ribs overlying said columns, and springs interposed between said seats and said bolster.

11. A truck having independently rotatable wheels and four identical longitudinal frame members, a pair of which are arranged upon opposite sides of the wheels at each side of the truck, each of the frame members being in the form of a casting and having an arched upper chord and a lower chord of truss form joining the upper chord at points spaced from the ends of the frame member, spaced columns connecting said chords and forming a substantially rectangular opening, the end portions of said frame members overlying the axles of the wheels and projecting beyond the wheels, end members connecting the ends of the frame members, spring seats interlocking with the bottom chords of each pair of frame members, a bolster having end portions extending through the aperture of said frame members and having guide ribs overlying said columns, springs interposed between said seats and said bolster, brake hanger brackets integral with said end members, links suspended from said brackets, and brake beams suspended on said links.

12. In a railway car truck, longitudinal frame members arranged in pairs, supporting wheels between the frame members of each pair, and means for mounting said wheels separately on said frame members comprising an axle for each wheel projecting on opposite sides of the wheel, said frame members being mounted in fixed relation to said axles, collars on the projecting ends of each axle, each collar having oppositely tapering conical external raceways, rings mounted within the frame members of greater diameter than said collars and having conical internal raceways and rollers interposed between said collars and rings.

13. A truck having front and rear supporting wheels, a transverse bolster between front and rear wheels and two pairs of longitudinal frame members, the frame members of each pair extending along opposite sides of front and rear wheels on one side of the truck, said frame members having central openings to receive the ends of said bolster and carrying seats for bolster supporting springs in the spaces between front and rear wheels, said frame members having means at the ends thereof for supporting brake beams so that the spaces between front and rear wheels are unobstructed and adapted to receive spring seats of a size to accommodate a relatively large number of bolster supporting springs.

14. A railway car truck comprising four longitudinal frame members arranged in pairs at opposite sides thereof, each provided with a bolster receiving aperture having an upper guide portion and a lower portion of greater width through which an end of a bolster may be inserted, a bolster having its ends extending through said apertures, said ends being guided for vertical movement in the upper portions of said apertures, wheels positioned between each pair of said frame members, each wheel being mounted to have rotation independently of the others, and transverse members connecting the frame members adjacent the ends thereof.

15. A railway car truck comprising four longitudinal frame members arranged in pairs at opposite sides thereof, each provided with a bolster receiving aperture having an upper guide portion and a lower portion of greater width through which an end of a bolster may be inserted, a bolster having its ends extending through said apertures and guided for vertical movement in said upper portions, wheels positioned between each pair of said frame members, each wheel having roller bearings and being mounted to rotate independently of the others, and transverse members connecting said frame members adjacent the ends thereof.

16. A railway car truck having a pair of longitudinal frame members arranged at each side thereof, each member being provided with a bolster receiving aperture having an upper guide portion and a lower portion of greater width through which an end of a bolster may be inserted, a bolster having its ends extending through said apertures and guided for vertical movement in the upper portions thereof, transversely extending axles mounted in said frame members and extending across the space between the frame members of each pair, and wheels mounted on the axles between the frame members of each pair, each of said wheels being mounted to rotate independently of the others.

17. A railway car truck, four longitudinal side frame members of truss form arranged in pairs at opposite sides thereof and provided with centrally disposed transversely alined bolster receiving apertures each having an upper guide portion and a lower portion of greater width, each side frame member having end portions which are provided on the under side thereof with downwardly facing recesses for receiving said axles, transverse axles seated in said recesses, axle retaining members secured to the under sides of said frame members and extending across said recesses for holding said axles in position, wheels mounted on the axles between the frame members, and a bolster having its ends resiliently supported for vertical movement in said upper guide portions of said apertures.

In testimony whereof I affix my signature.

CLAUS J. WERNER CLASEN.